United States Patent [19]
Kho

[11] Patent Number: 6,167,473
[45] Date of Patent: Dec. 26, 2000

[54] SYSTEM FOR DETECTING PERIPHERAL INPUT ACTIVITY AND DYNAMICALLY ADJUSTING FLUSHING RATE OF CORRESPONDING OUTPUT DEVICE IN RESPONSE TO DETECTED ACTIVITY LEVEL OF THE INPUT DEVICE

[75] Inventor: Samuel P. Kho, Sunnyvale, Calif.

[73] Assignee: New Moon Systems, Inc., San Jose, Calif.

[21] Appl. No.: 08/863,032

[22] Filed: May 23, 1997

[51] Int. Cl.$^7$ .................................................. G06F 13/14
[52] U.S. Cl. .................... 710/107; 710/129; 709/203; 711/135
[58] Field of Search .................... 395/200.33, 287, 395/309, 821; 709/203; 710/107, 129; 711/1, 135

[56] References Cited

U.S. PATENT DOCUMENTS

| | | | |
|---|---|---|---|
| 4,601,001 | 7/1986 | Guiglini | 364/518 |
| 4,821,185 | 4/1989 | Esposito | 364/200 |
| 4,837,561 | 6/1989 | Tucker | 340/722 |
| 5,359,713 | 10/1994 | Moran et al. | 395/200 |
| 5,506,967 | 4/1996 | Barajas et al. | 395/250 |
| 5,687,348 | 11/1997 | Wittaker | 395/460 |
| 5,732,240 | 3/1998 | Caccavale | 395/445 |
| 5,737,573 | 4/1998 | Funaki et al. | 395/486 |
| 5,758,189 | 5/1998 | Nakada et al. | 710/46 |
| 5,761,450 | 6/1998 | Shah | 395/287 |
| 5,768,548 | 6/1998 | Young et al. | 395/309 |
| 5,892,937 | 4/1999 | Caccavale | 711/135 |

*Primary Examiner*—Thomas C. Lee
*Assistant Examiner*—Abdelmoniem Elamin
*Attorney, Agent, or Firm*—Fernandez & Associates, LLP

[57] ABSTRACT

A networked computer system having buffered user interface includes processor, memory, input/output devices and software for detecting input activity and adjusting flushing rate of the output device in response to detected activity level of the input device. A buffer stores captured data and is flushed when full, when elapsed time since last flush exceeds specified period, or when trigger event is detected, such as keyboard or mouse movement is detected. Flush period is variable according to frequency of trigger event (i.e., while not detect trigger event, extend flush period).

6 Claims, 5 Drawing Sheets

```
if (DataPending())
   FillPacketWithData();

If (CurrentTime() - LastFlushTime > FlushPeriod)
{
   FlushPacket();
   LastFlushTime = CurrentTime();
}
else if (PacketSize() > PacketSizeThreshold)
{
   FlushPacket();
   LastFlushTime = CurrentTime();
}

//
//  better user interactivity and packet utilization code
// follows
//
if (MouseInput() | |
   KeyboardInput () | |
   OtherInput()
   )
{
   FlushPeriod = 0;
   //
   //   alternative:
   //
   //  FlushPeriod = FlushPeriod - DeltaPeriod;
}
else
{
      FlushPeriod = FlushPeriod + DeltaPeriod;
}
```

FIG. 3

| Time | Background Output | Input-Driven Output | Total Output | T(Flush) | Buffered | Flushed |
|---|---|---|---|---|---|---|
| 0.1 | 500 | 0 | 500 | 0.5 | 500 | 0 |
| 0.2 | 500 | 0 | 500 | 0.5 | 1000 | 0 |
| 0.3 | 500 | 0 | 500 | 0.5 | 1500 | 0 |
| 0.4 | 500 | 0 | 500 | 0.5 | 2000 | 0 |
| 0.5 | 500 | 0 | 500 | 0.5 | 2500 | 2500 |
| 0.6 | 500 | 0 | 500 | 0.5 | 500 | 0 |
| 0.7 | 500 | 0 | 500 | 0.5 | 1000 | 0 |
| 0.8 | 500 | 0 | 500 | 0.5 | 1500 | 0 |
| 0.9 | 500 | 0 | 500 | 0.5 | 2000 | 0 |
| 1 | 500 | 0 | 500 | 0.5 | 2500 | 2500 |
| 1.1 | 500 | 0 | 500 | 0.5 | 500 | 0 |
| 1.2 | 500 | 0 | 500 | 0.5 | 1000 | 0 |
| 1.3 | 500 | 0 | 500 | 0.5 | 1500 | 0 |
| 1.4 | 500 | 0 | 500 | 0.5 | 2000 | 0 |
| 1.5 | 500 | 0 | 500 | 0.5 | 2500 | 2500 |
| 1.6 | 500 | 0 | 500 | 0.5 | 500 | 0 |
| 1.7 | 500 | 0 | 500 | 0.5 | 1000 | 0 |
| 1.8 | 500 | 0 | 500 | 0.5 | 1500 | 0 |
| 1.9 | 500 | 0 | 500 | 0.5 | 2000 | 0 |
| 2 | 500 | 0 | 500 | 0.5 | 2500 | 2500 |
| 2.1 | 500 | 0 | 500 | 0.5 | 500 | 0 |
| 2.2 | 500 | 0 | 500 | 0.5 | 1000 | 0 |
| 2.3 | 500 | 0 | 500 | 0.5 | 1500 | 0 |
| 2.4 | 500 | 0 | 500 | 0.5 | 2000 | 0 |
| 2.5 | 500 | 0 | 500 | 0.5 | 2500 | 2500 |
| 2.6 | 500 | 0 | 500 | 0.5 | 500 | 0 |
| 2.7 | 500 | 0 | 500 | 0.5 | 1000 | 0 |
| 2.8 | 500 | 0 | 500 | 0.5 | 1500 | 0 |
| 2.9 | 500 | 0 | 500 | 0.5 | 2000 | 0 |
| 3 | 500 | 0 | 500 | 0.5 | 2500 | 2500 |
| 3.1 | 500 | 500 | 1000 | 0.5 | 1000 | 0 |
| 3.2 | 500 | 0 | 500 | 0.5 | 1500 | 0 |
| 3.3 | 500 | 500 | 1000 | 0.5 | 2500 | 0 |
| 3.4 | 500 | 0 | 500 | 0.5 | 3000 | 0 |
| 3.5 | 500 | 500 | 1000 | 0.5 | 4000 | 4000 |
| 3.6 | 500 | 0 | 500 | 0.5 | 500 | 0 |
| 3.7 | 500 | 500 | 1000 | 0.5 | 1500 | 0 |
| 3.8 | 500 | 0 | 500 | 0.5 | 2000 | 0 |
| 3.9 | 500 | 500 | 1000 | 0.5 | 3000 | 0 |
| 4 | 500 | 0 | 500 | 0.5 | 3500 | 3500 |
| 4.1 | 500 | 0 | 500 | 0.5 | 500 | 0 |
| 4.2 | 500 | 0 | 500 | 0.5 | 1000 | 0 |
| 4.3 | 500 | 0 | 500 | 0.5 | 1500 | 0 |
| 4.4 | 500 | 0 | 500 | 0.5 | 2000 | 0 |
| 4.5 | 500 | 0 | 500 | 0.5 | 2500 | 2500 |
| 4.6 | 500 | 0 | 500 | 0.5 | 500 | 0 |
| 4.7 | 500 | 0 | 500 | 0.5 | 1000 | 0 |
| 4.8 | 500 | 0 | 500 | 0.5 | 1500 | 0 |
| 4.9 | 500 | 0 | 500 | 0.5 | 2000 | 0 |
| 5 | 500 | 0 | 500 | 0.5 | 2500 | 2500 |
| 5.1 | 0 | 0 | 0 | 0.5 | 0 | 0 |

FIG. 4

| Time | Background Output | Input-Driven Output | Total Output | T(Flush) | Buffered | Flushed |
|---|---|---|---|---|---|---|
| 0.1 | 500 | 0 | 500 | 0.5 | 500 | 0 |
| 0.2 | 500 | 0 | 500 | 0.5 | 1000 | 0 |
| 0.3 | 500 | 0 | 500 | 0.5 | 1500 | 0 |
| 0.4 | 500 | 0 | 500 | 0.5 | 2000 | 0 |
| 0.5 | 500 | 0 | 500 | 0.5 | 2500 | 2500 |
| 0.6 | 500 | 0 | 500 | 0.6 | 500 | 0 |
| 0.7 | 500 | 0 | 500 | 0.6 | 1000 | 0 |
| 0.8 | 500 | 0 | 500 | 0.6 | 1500 | 0 |
| 0.9 | 500 | 0 | 500 | 0.6 | 2000 | 0 |
| 1 | 500 | 0 | 500 | 0.6 | 2500 | 0 |
| 1.1 | 500 | 0 | 500 | 0.6 | 3000 | 3000 |
| 1.2 | 500 | 0 | 500 | 0.7 | 500 | 0 |
| 1.3 | 500 | 0 | 500 | 0.7 | 1000 | 0 |
| 1.4 | 500 | 0 | 500 | 0.7 | 1500 | 0 |
| 1.5 | 500 | 0 | 500 | 0.7 | 2000 | 0 |
| 1.6 | 500 | 0 | 500 | 0.7 | 2500 | 0 |
| 1.7 | 500 | 0 | 500 | 0.7 | 3000 | 0 |
| 1.8 | 500 | 0 | 500 | 0.7 | 3500 | 3500 |
| 1.9 | 500 | 0 | 500 | 0.8 | 500 | 0 |
| 2 | 500 | 0 | 500 | 0.8 | 1000 | 0 |
| 2.1 | 500 | 0 | 500 | 0.8 | 1500 | 0 |
| 2.2 | 500 | 0 | 500 | 0.8 | 2000 | 0 |
| 2.3 | 500 | 0 | 500 | 0.8 | 2500 | 0 |
| 2.4 | 500 | 0 | 500 | 0.8 | 3000 | 0 |
| 2.5 | 500 | 0 | 500 | 0.8 | 3500 | 0 |
| 2.6 | 500 | 0 | 500 | 0.8 | 4000 | 4000 |
| 2.7 | 500 | 0 | 500 | 0.9 | 500 | 0 |
| 2.8 | 500 | 0 | 500 | 0.9 | 1000 | 0 |
| 2.9 | 500 | 0 | 500 | 0.9 | 1500 | 0 |
| 3 | 500 | 0 | 500 | 0.9 | 2000 | 0 |
| 3.1 | 500 | 500 | 1000 | 0.3 | 3000 | 0 |
| 3.2 | 500 | 0 | 500 | 0.3 | 3500 | 0 |
| 3.3 | 500 | 500 | 1000 | 0.3 | 4500 | 4500 |
| 3.4 | 500 | 0 | 500 | 0.3 | 500 | 0 |
| 3.5 | 500 | 500 | 1000 | 0.3 | 1500 | 0 |
| 3.6 | 500 | 0 | 500 | 0.3 | 2000 | 2000 |
| 3.7 | 500 | 500 | 1000 | 0.3 | 1000 | 0 |
| 3.8 | 500 | 0 | 500 | 0.3 | 1500 | 0 |
| 3.9 | 500 | 500 | 1000 | 0.3 | 2500 | 2500 |
| 4 | 500 | 0 | 500 | 0.3 | 500 | 0 |
| 4.1 | 500 | 0 | 500 | 0.3 | 1000 | 0 |
| 4.2 | 500 | 0 | 500 | 0.3 | 1500 | 1500 |
| 4.3 | 500 | 0 | 500 | 0.4 | 500 | 0 |
| 4.4 | 500 | 0 | 500 | 0.4 | 1000 | 0 |
| 4.5 | 500 | 0 | 500 | 0.4 | 1500 | 0 |
| 4.6 | 500 | 0 | 500 | 0.4 | 2000 | 2000 |
| 4.7 | 500 | 0 | 500 | 0.5 | 500 | 0 |
| 4.8 | 500 | 0 | 500 | 0.5 | 1000 | 0 |
| 4.9 | 500 | 0 | 500 | 0.5 | 1500 | 0 |
| 5 | 500 | 0 | 500 | 0.5 | 2000 | 0 |
| 5.1 | 0 | 0 | 0 | 0.5 | 2000 | 2000 |

FIG. 5

SYSTEM FOR DETECTING PERIPHERAL INPUT ACTIVITY AND DYNAMICALLY ADJUSTING FLUSHING RATE OF CORRESPONDING OUTPUT DEVICE IN RESPONSE TO DETECTED ACTIVITY LEVEL OF THE INPUT DEVICE

BACKGROUND OF THE INVENTION

1. Field of the Invention

The invention relates to digital computer systems, particularly computer interface subsystems and improved user interactivity through output and input peripheral devices.

2. Description of Background Art

Conventional computer systems are equipped with peripheral devices such as keyboard, mouse, and video display screen to provide users with various input and output means for interfacing to system processor and other interconnected resources. Ordinarily, such interface techniques and mechanisms operate with adequate performance and are coupled directly to a processor which executes program instructions locally such that users do not experience substantial latency during input-output instruction transfer and user interaction with the system.

However, as computers are increasingly interconnected across local and wide area networks such that users may access processors and data remotely over various connections, there is substantially increased and less predictable delays introduced into overall system response, which are particularly noticeable at the user interface. There is a need therefore to provide computer interface with improved user interactive sensitivity.

SUMMARY OF THE INVENTION

The invention resides in a computer system having a processor; storage; input and/or output devices and programmable functionality which detects peripheral input activity and adjusts flushing rate or period of corresponding output device in response to detected activity level of the input device. Programmable functionality is provided in one or more computer systems preferably in software or equivalent firmware circuitry for detecting level of input device activity and thereby adjusts upward or downward the frequency of outbound flow of data, or flushing period, through the output device in predefined or dynamically proportional response to detected activity level of the input device. In a network configuration, such programmable functionality may operate such that input and/or display is remote from computing device.

With this automated I/O technique, computer user interface is effectively improved by dynamically heightening machine responsiveness to actual level of detected human activity. Preferably, a buffer or other equivalent cache memory stores captured data and is cleared or flushed under certain conditions, such as when detected to be full, when elapsed time since last flush exceeds specified period, or when predefined trigger event occurs, such as keyboard entry, mouse movement, or other input signal is detected. Flush period or rate is variable according to frequency of trigger event (i.e., while not detect trigger event, extend flush period).

BRIEF DESCRIPTION OF THE DRAWINGS

FIG. 3 is representative pseudo-code for executing software instructions to provide improved user interactivity according to the present invention.

FIG. 4 is representative interface timing information for conventional computer system.

FIG. 5 is representative interface timing information for improved computer system configured according to the present invention to provide effectively improved input-output sensitivity.

DETAILED DESCRIPTION OF THE PREFERRED EMBODIMENT

Figure 1:
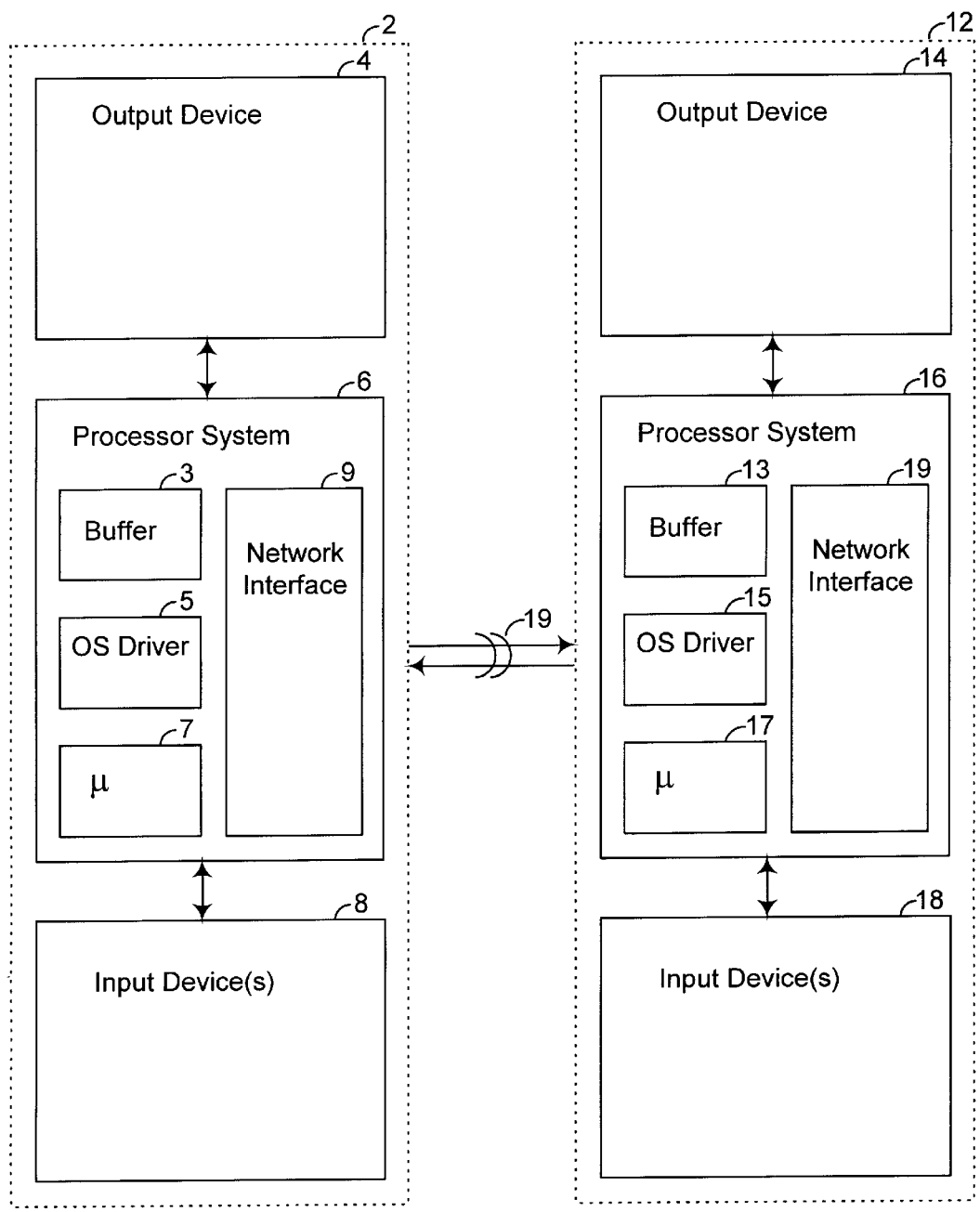
FIG. 1 is a block diagram of a networked computer system, each including processor and input/output devices for operation according to the present invention.

FIG. 1 is a block diagram of multiple conventional interconnected 19 computer systems 2, 12, each system including processor subsystems 6, 16 having network interface 9, 19, microprocessor 7, 17, operating system and drivers 5, 15, and storage memory and buffer 3, 13, network interface 9, 19, user interface devices for output 4, 14, such as display screen and speaker, and for input 8, 18 such as keyboard, mouse, microphone, and digital camera. Each computer system may be equipped with various commercially available software, such as operating system, application programs, device driver, and network communication software. Preferably, output buffer or equivalent associative memory means is provided in storage 3, 13 for storing outbound data in First-In/First-Out (FIFO) fashion, typically cached or queued by processor 7, 17 between the processor and certain output device or network communication serial or parallel interface.

In accordance with an important aspect of the present invention, programmable functionality is provided in one or more computer systems preferably in software or equivalent firmware circuitry for detecting level of input device activity and thereby adjusts upward or downward the frequency of outbound flow of data, or flushing period, of the output device in predefined or dynamically proportional response to detected activity level of the input device.

With this automated technique, computer user interface is effectively improved by responsively heightening observable machine sensitivity to actual level of detected human activity. Preferably, a buffer or other equivalent cache memory stores captured data and is cleared or flushed under certain conditions, such as when detected to be full, when elapsed time since last flush exceeds specified period, or when predefined trigger event occurs, such as keyboard entry, mouse movement, or other input signal is detected. Flush period is variable according to frequency of trigger event (i.e., while not detect trigger event, extend flush period).

In addition to improving I/O sensitivity, bandwidth usage may be improved. This results from increasing the likelihood of flush occurrence when buffer is full (i.e., full buffer means good bandwidth usage). Such result is achieved by increasing flushing period. But high flushing period may mean reduced input sensitivity.

Further in network configuration, as shown in FIG. 1, input-output sensitivity is improved when multiple computer systems 2, 12 are interconnected and operated according to the present invention. For example, in a client-server mode wherein I/O instructions are partitioned from other compute instructions in a given application for distributed processing, such that I/O instructions are executed by one or more client machine, and partitioned compute instructions are executed by server machine, computer system 2 acts as client to server computer system 12, output device 4 and input device 8 of client machine 2 may be coupled remotely across network 19 to processor system 16 of server machine 12, or vice versa wherein computer system 2 acts as server to computer system 12 which acts as client thereto, or other combination of client-server I/O device usage to share resources across the network.

In such example, improved client I/O sensitivity and bandwidth usage is achieved by causing programmable functionality to detect level of client input device activity and thereby adjusts upward or downward the frequency of outbound flow of data, or flushing period, of client output device in predefined or dynamically proportional response to detected activity level of the input device, even while substantial portion of partitioned compute instructions are executed by server machine.

Figure 2:
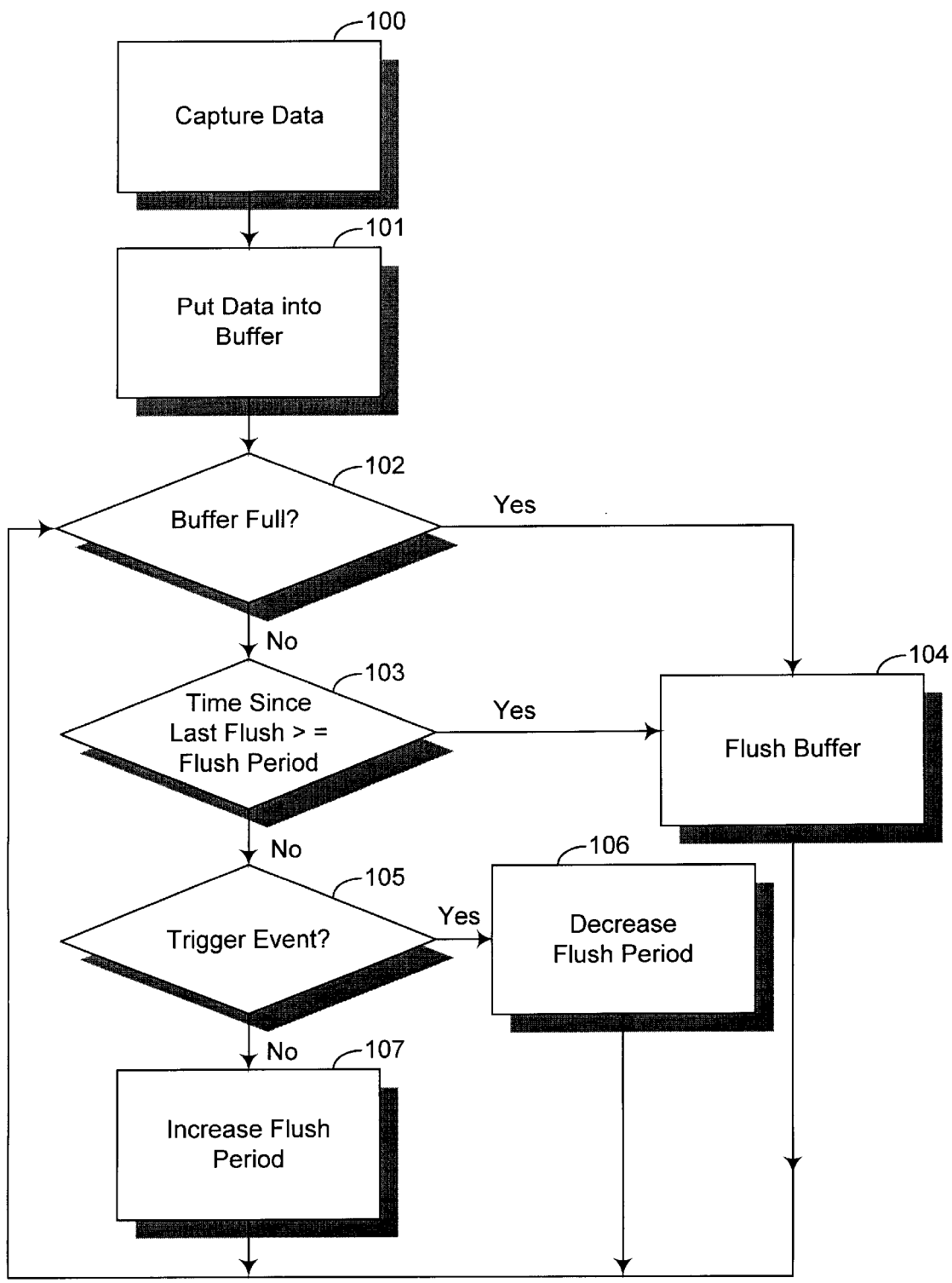
FIG. 2 is a flow chart of functional steps performed by a computer system such as shown in FIG. 1 for providing improved user interactivity according to the present invention.

FIG. 2 is a flow chart of functional steps associated with inventive programmable functionality as implemented by one or more computer system 2, 12 primarily in software provided in storage 3, 13 of processor subsystem 6, 16 or possibly functionally equivalent firmware provided similarly therein for delivering improved user interactivity. Initially, outbound data (i.e., being processed by the computer 6 or 16 internally for digital transmission to external user or other computers connected thereto across conventional communications network 19, and intended for output device 4 or 14) is captured 100 from outbound digital data stream and stored 101 temporarily in buffer 3, 13.

Then, processor 7, 17 determines 102 whether buffer 3, 13 is full. If so, buffer 3, 13 is flushed 104 (i.e., data contained therein is essentially emptied-out and sent outbound as intended). Otherwise, if buffer 3, 13 is not full, then processor 7, 17 determines 103 whether time elapsed since last flushing of buffer 3, 13 is greater than or equal to pre-specified, variable flush period. If so, buffer 3, 13 is flushed 104. Otherwise, if time elapsed since last flushing of buffer 3, 13 is not greater than or equal to pre-specified flush period, then processor 7, 17 determines 105 whether there is a current or recently-detected trigger event, such as any signal indicating user input like mouse movement, video camera motion, keyboard entry, microphone sound, or other similar electronic stimulus. If so, then processor 7, 17 causes flush period to be decreased 106 by a specified amount. Otherwise, no current or recent trigger event is detected, then processor 7, 17 causes flush period to be increased 107 by a specified amount. Then, after steps 104, 106 or 107, step 102 is repeated.

FIG. 3 is representative pseudo code for executing software instructions to provide improved user interactivity according to the present invention. In particular, such sample program code specifies buffer flush timing, and how flush period is determined when certain input device signals are detected.

FIGS. 4 and 5 are representative interface timing information, namely elapsed time, background output, input-driven output, total output, flush time, buffered data, and flushed data. FIG. 4 shows typical data for conventional computer system, i.e., without improved I/O sensitivity as described herein. In comparison, FIG. 5 shows timing information for improved computer system configured according to the present invention to provide effectively improved input-output sensitivity.

Both FIGS. 4 and 5 show timing information charts for simulated program functionality over 5 seconds. Such sample program constantly provides 500-byte output every 0.1 second. In this example, the program performs constant background drawing, such as drawing circles and rectangles (e.g., screen saver program which keeps drawing without user input); it also draws something whenever mouse is clicked. Here, every time mouse is clicked, the drawing in response to input also generates 500 bytes of data. In particular, information provided is defined as follows:

| | |
|---|---|
| Time | Elapsed time in seconds |
| Background Output | 500 bytes/0.1 second background drawing |
| Input-Driven Output | Drawing "spurt" every time mouse is clicked |
| Total Output | Background Output + Input-Driven Output |
| T(Flush) | Flushing rate or period |
| Buffered | Number of bytes in output buffer |
| Flushed | Number of bytes flushed |

Buffered information represents cumulative bytes since last flush (i.e., total output added up.) Every time flush occurs, number of bytes is indicated in Flushed column. and corresponding row is boldfaced; buffered activity starts over in next row (i.e., for any given row, Buffered number is sum of all Total Output since the last boldfaced (flushed) row.)

FIG. 4 shows representative timing using conventional method, wherein T(Flush) is constant. In comparison, in FIG. 5 T(Flush) changes. T(Flush) accounts for number of rows from each flush to next (i.e., interval between boldfaced rows).

General functional objective is to maximize average Flushed parameter. Moreover, high buffer usage at time of flush results in good bandwidth utilization. Another objective is to minimize latency from input. This is the interval between each time Input-Driven Output has a non-zero number to next flush event (boldfaced rows). Further, minimizing time between trigger and flush events results in smoother look-and-feel perception to user. In both examples shown, Flushed is the same, and average number of bytes buffered on flush is 2750. Using conventional method, average latency from input is 0.2 second (i.e., average number of rows from each 500 in Input-Driven Output column to the next boldfaced row), whereas using inventive method, average latency is 0.1 second. Thus, representative inventive method preserves same bandwidth usage characteristics, but decreases latency by 50%.

What is claimed is:

1. A computer system having enhanced user interface comprising:

a processor, a memory, an input device, an output device;

a flushing period adjustment software means executable by the processor in memory, for detecting input activity and dynamically adjusting flushing period for the output device in response to detected activity level of the input device, wherein the flushing period is increased while no activity is detected by the processor;

wherein the output device is flushed when either of the following two conditions are met:
  (a) the output device is full; or
  (b) the output device is not full, but the time since the last flush is greater than or equal to the flush period.

2. The system of claim 1 further comprising:

an output buffer, wherein outbound data from the system is stored by the processor in the output buffer, and content of such output buffer is dynamically flushed according to the adjusted flushing period.

3. In a computer system having a processor, a storage, an input device, an output device, and an output buffer, a programmable method for enhancing user interface to the flushing period of the computer system comprising the steps of:

storing outbound data in an output buffer;

flushing buffer content through the output device according to a flushing period;

dynamically adjusting the flushing period according to a trigger event caused by the input device, wherein the flushing period is increased while no activity is detected by the processor;

wherein the buffer is flushed when either of the following two conditions are met:
(a) the buffer is full; or
(b) the buffer is not full, but the time since the last flush is greater than or equal to the flush period.

4. A flushing system, comprising:

programmable functionality executable by a processor in memory for detecting input activity and dynamically adjusting the flushing period for an output device;

an input device for triggering the dynamic adjustment of the flushing rate, the flushing rate being dynamically adjusted by the existence or non existence of a predefined trigger event;

a buffer having inputs and outputs for storing outbound data, the inputs of the buffer being coupled to the input device;

an output device having inputs and outputs for flushing the output data at the output rate, the inputs of the output device being coupled to the buffer;

wherein the input device increases the flushing rate if the input device receives no predefined triggering event;

wherein the output data is flushed when either of the following two conditions are met:
(a) the buffer is full; or
(b) the buffer is not full, but the time since the last flush is greater than or equal to the flush period.

5. The flushing system of claim 4 wherein the input device decreases the flushing rate if the input device receives at least one predefined triggering event.

6. The flushing system of claim 5 wherein the predefined triggering event includes a keyboard entry or mouse movement.

* * * * *